United States Patent
Yokono et al.

(10) Patent No.: US 9,031,327 B2
(45) Date of Patent: May 12, 2015

(54) INFORMATION PROCESSING DEVICE, METHOD, AND PROGRAM THAT RECOGNIZES A PREDETERMINED PART OF A BODY

(75) Inventors: Jun Yokono, Tokyo (JP); Takuya Narihira, Tokyo (JP)

(73) Assignee: Sony Corporation, Tokyo (JP)

( * ) Notice: Subject to any disclaimer, the term of this patent is extended or adjusted under 35 U.S.C. 154(b) by 824 days.

(21) Appl. No.: 13/233,351

(22) Filed: Sep. 15, 2011

(65) Prior Publication Data

US 2012/0076428 A1    Mar. 29, 2012

(30) Foreign Application Priority Data

Sep. 27, 2010   (JP) .................................. 2010-215680

(51) Int. Cl.
*G06K 9/46* (2006.01)
*G06K 9/00* (2006.01)

(52) U.S. Cl.
CPC .................................. *G06K 9/00382* (2013.01)

(58) Field of Classification Search
None
See application file for complete search history.

(56) References Cited

U.S. PATENT DOCUMENTS

| | | | |
|---|---|---|---|
| 6,748,114 B1 * | 6/2004 | Ishikawa | 382/236 |
| 2002/0187846 A1 * | 12/2002 | Funk | 473/219 |
| 2006/0062472 A1 * | 3/2006 | Engelberg et al. | 382/190 |
| 2007/0253596 A1 * | 11/2007 | Murata et al. | 382/103 |
| 2008/0152191 A1 * | 6/2008 | Fujimura et al. | 382/103 |
| 2011/0081045 A1 * | 4/2011 | Lee et al. | 382/103 |

FOREIGN PATENT DOCUMENTS

| | | |
|---|---|---|
| JP | 2009-18158 | 1/2009 |
| JP | 2010-61376 | 3/2010 |
| JP | 2010-88531 | 4/2010 |

* cited by examiner

*Primary Examiner* — Sumati Lefkowitz
*Assistant Examiner* — Jhere Rowland
(74) *Attorney, Agent, or Firm* — Oblon, McClelland, Maier & Neustadt, L.L.P.

(57) ABSTRACT

An information processing device includes: a recognizer configured to recognize a predetermined part of a body of a person from an input image including the person; an evaluator configured to evaluate a difference between a recognized input part and a reference part serving as a basis; and a notifying unit configured to notify information relating to the difference of the input part from the reference part based on an evaluation result.

7 Claims, 13 Drawing Sheets

INFORMATION PROCESSING DEVICE, METHOD, AND PROGRAM THAT RECOGNIZES A PREDETERMINED PART OF A BODY

BACKGROUND

The present disclosure relates to information processing devices and methods and programs and particularly to information processing device and method and a program that can assist correct action and posture.

As related arts, various kinds of techniques to evaluate human action and posture have been proposed.

For example, an action evaluating device that evaluates the action of a person from a photographic moving image based on evaluation from an evaluator (external basis) has been disclosed (refer to e.g. Japanese Patent Laid-Open No. 2010-61376).

Furthermore, there has been disclosed apparatus that photographs a pin set up in a hole in a putting green of a golf course by a camera and combines the photographed image with a detection result of a slope sensor that measures the slope direction and slope angle of the green to thereby assist putting practice (refer to e.g. Japanese Patent Laid-open No. 2010-88531). In this device, the slope direction and the slope angle are obtained by the slope sensor. Thus, the putting direction and the strength of the putting stroke are indicated.

In addition, there has been disclosed a posture monitoring system in which a large number of special sensors such as a temperature sensor are mounted on clothes and the posture of a person is determined to thereby allow a doctor at a remote place to monitor the posture and give advice and so forth (refer to e.g. Japanese Patent Laid-open No. 2009-18158).

SUMMARY

However, in these related arts, merely human action and posture are evaluated from a photographed moving image. Alternatively, even by a system to assist human action and posture, the user does not receive sufficient assistance and therefore it is difficult for the user to take correct action and posture in some cases.

There is a need for a technique to assist correct action and posture to allow the user to surely take correct action and posture.

According to an embodiment of the present disclosure, there is provide an information processing device including a recognizer configured to recognize a predetermined part of the body of a person from an input image including the person, an evaluator configured to evaluate a difference between a recognized input part and a reference part serving as the basis, and a notifying unit configured to notify information relating to the difference of the input part from the reference part based on the evaluation result.

According to another embodiment of the present disclosure, there is provided an information processing method including recognizing a predetermined part of the body of a person from an input image including the person by an information processing device, evaluating a difference between a recognized input part and a reference part serving as the basis by the information processing device, and notifying information relating to the difference of the input part from the reference part based on the evaluation result by the information processing device.

According to another embodiment of the present: disclosure, there is provided a program for causing a computer to function as a device including a recognizer configured to recognize a predetermined part of the body of a person from an input image including the person, an evaluator configured to evaluate a difference between a recognized input part and a reference part serving as the basis, and a notifying unit configured to notify information relating to the difference of the input part from the reference part based on the evaluation result.

In the information processing device and method and the program of the embodiments of the present disclosure, a predetermined part of the body of a person is recognized from an input image including the person and a difference between a recognized input part and a reference part serving as the basis is evaluated. Based on the evaluation result, information relating to the difference of the input part from the reference part is notified.

The embodiments of the present disclosure enable the user to surely take correct action and posture.

DETAILED DESCRIPTION OF THE PREFERRED EMBODIMENTS

Modes for carrying out the present disclosure (hereinafter, referred to as embodiments) will be described below. The order of the description is as follows.

1. First Embodiment
2. Second Embodiment
3. Modification Examples

<1.First Embodiment>
[Configuration of Television Receiver]

Figure 1:
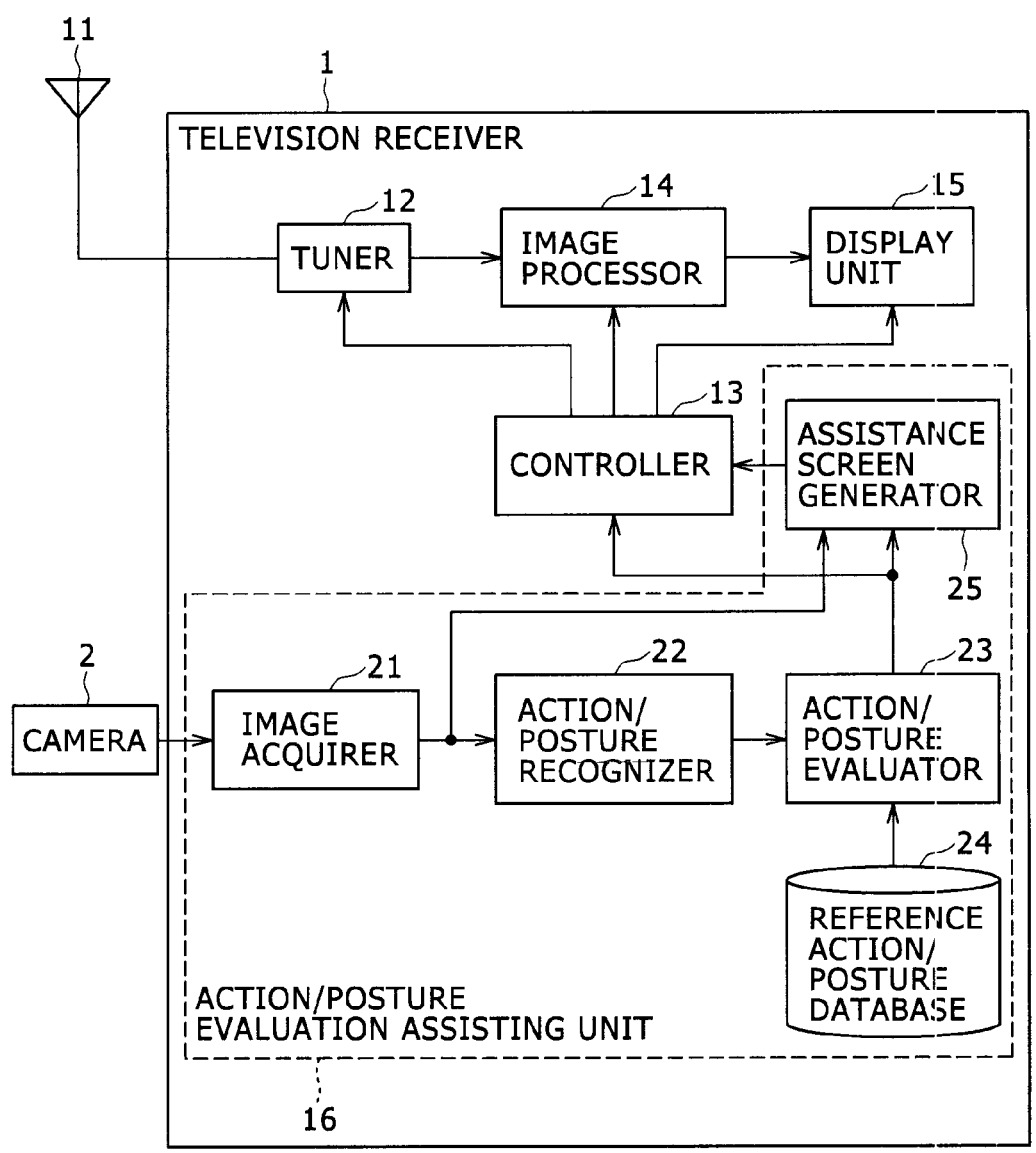
FIG. 1 is a diagram showing the configuration of a television receiver according to one embodiment of the present disclosure.

FIG. 1 is a diagram showing the configuration of a television receiver according to one embodiment of the present disclosure.

This television receiver 1 is apparatus for viewing content corresponding to a broadcast signal compatible with broadcast radio waves of television broadcasting and a reproduction signal reproduced by a connected reproducing device (not shown).

The television receiver 1 has a function to detect a gesture (action and posture) performed by the user and execute the function corresponding to the gesture. Specifically, in the television receiver 1, a predetermined gesture performed by the user is associated with a predetermined function and the user realizes the predetermined function by inputting the predetermined gesture instead of operating a remote controller.

The television receiver 1 includes an antenna 11, a tuner 12, a controller 13, an image processor 14, a display unit 15, and an action/posture evaluation assistance unit 16. To the television receiver 1, a camera 2 is attached at such a position as to be capable of photographing the user existing in front of the television receiver 1 (on the side of the display unit 15).

The-antenna 11 receives a broadcast signal compatible with broadcast radio waves of television broadcasting, such as terrestrial waves and radio waves from satellite broadcasting, and supplies it to the tuner 12.

An order signal to specify the reception-subject broadcast station corresponding to the gesture by the user is supplied from the controller 13 to the tuner 12. The tuner 12 demodulates the broadcast signal supplied from the antenna 11 in accordance with the order signal from the controller 13 and supplies an image signal obtained by the demodulation to the image processor 14.

The image processor 14 converts the image signal supplied from the tuner 12 to image data to be displayed by the display unit 15. The image processor 14 makes the display unit 15 display an image (content) corresponding to the converted image data in accordance with control by the controller 13.

The camera 2 is attached to the upper part of the television receiver 1 for example. It photographs the user existing in front of the camera 2 and supplies the image data obtained by the photographing to the action/posture evaluation assistance unit 16.

The action/posture evaluation assistance unit 16 executes processing of detecting and evaluating the action and posture of the user and assisting the user in taking correct action and posture based on the image data supplied from the camera 2. Furthermore, the action/posture evaluation assistance unit 16 supplies the evaluation result to the controller 13.

The action/posture evaluation assistance unit 16 includes an image acquirer 21, an action/posture recognizer 22, an action/posture evaluator 23, a reference action/posture database 24, and an assistance screen generator 25.

The image acquirer 21 acquires image data obtained by photographing by the camera 2 (hereinafter, referred to also as input image) and supplies it to the action/posture recognizer 22 and the assistance screen generator 25.

The action/posture recognizer 22 executes action/posture recognition processing based on the image data supplied from the image acquirer 21 and supplies the recognition result to the action/posture evaluator 23.

In this action/posture recognition processing, the joint angles of predetermined parts of a human body (e.g. user's parts such as limbs and neck), obtained from the image data, are recognized on a part-by-part basis. The details thereof will be described later.

The joint angle of each part is supplied from the action/posture recognizer 22 to the action/posture evaluator 23. The action/posture evaluator 23 reads out the joint angles corresponding to an action stored in the reference action/posture database 24 (hereinafter, referred to as reference action) depending on the action corresponding to the joint angle of each part, supplied from the action/posture recognizer 22 (hereinafter, referred to as input action).

In the following description, in order to discriminate the above-described joint angle, the joint angle obtained from image data arising from photographing by the camera 2 will be referred to as the input-action joint angle. In addition, the joint angle associated with a reference action stored in the reference action/posture database 24 will be referred to as the reference-action joint angle.

The details of the configuration of the reference action/posture database 24 will be described below with reference to FIG. 2.

Figure 2:
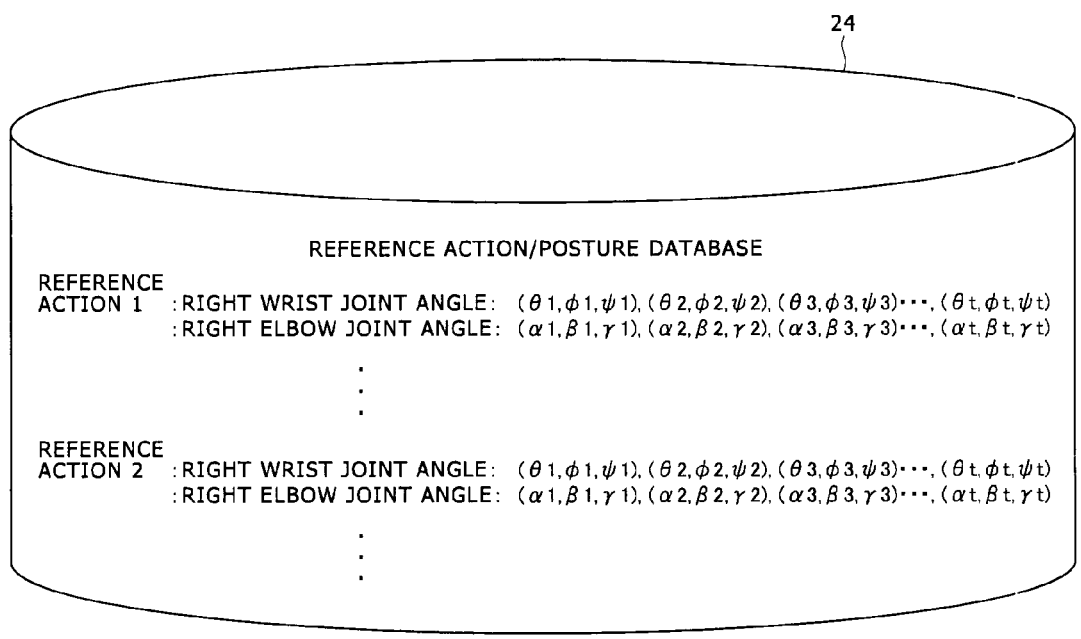
FIG. 2 is a diagram showing a configuration example of a reference action/posture database.

As shown in FIG. 2, in the reference action/posture database 24, reference actions 1, 2, ..., n are stored as reference actions registered in advance. A joint angle group including the right wrist joint angle, the right elbow joint angle, and so forth arranged in a time-series manner is associated with each of these reference actions. In FIG. 2, reference actions 1 and 2 are shown as representatives.

For example, in the case of the right wrist joint angle of reference action 1 in the reference action/posture database 24, the joint angle transitions in order of $(\theta1, \phi1, \psi1)$, $(\theta1, \phi2, \psi2)$, $(\theta3, \phi3, \psi3)$, ..., $(\theta t, \phi t, \psi t)$. over time. Furthermore, in the right elbow joint angle of reference action 1, transition occurs in order of $(\alpha1, \beta1, \gamma1)$, $(\alpha2, \beta2, \gamma2)$, $(\alpha3, \beta3, \gamma3)$, ..., $(\alpha t, \beta t, \gamma t)$. Also in the other joint angles, the angle transitions over time similarly.

Specifically, in general, the joint angle is represented by three rotational angles $(\theta, \phi, \psi)$ and $(\alpha, \beta, \gamma)$ as three-dimensional joint angles, and action and posture are uniquely decided by this joint angle. These rotational angles are registered in a time-series manner as a series of action on each joint angle basis. This allows reference action 1 to be specified based on the transition of these respective joint angles.

Each of reference actions 2 to n is also specified based on the transition of the three-dimensional joint angles arranged in a time-series manner on each joint angle basis similarly to the above-described reference action 1.

Reference actions n (n=1, 2, 3, ..., n) and the joint angles corresponding to these reference actions are obtained and registered in advance by learning with use of plural sample images. The details thereof will be described later.

Referring back to FIG. 1, the action/posture evaluator 23 executes action/posture evaluation processing based on the input-action joint angle from the action/posture recognizer 22 and the reference-action joint angle from the reference action/posture database 24, and supplies the evaluation result to the controller 13 and the assistance screen generator 25.

In this action/posture evaluation processing, the difference between the input-action joint angle and the reference-action joint angle, i.e. the difference between the input part and the reference part, is evaluated. The details thereof will be described later.

The controller 13 controls the operation of the respective units of the television receiver 1 based on the evaluation result supplied from the action/posture evaluator 23 and executes the predetermined function corresponding to the input action recognized based on the predetermined gesture performed by the user.

To the assistance screen generator 25, the image data from the image acquirer 21 and the evaluation result from the action/posture evaluator 23 are supplied.

The assistance screen generator 25 superimposes information relating to the evaluation result from the action/posture evaluator 23 on the input image corresponding to the image data from the image acquirer 21 to thereby generate a screen to assist the user in taking correct action and posture (hereinafter, referred to as action/posture assistance screen) and supply it to the controller 13.

The controller 13 makes the display unit 15 display the action/posture assistance screen supplied from the assistance screen generator 25.

In the above-described manner, the television receiver 1 is configured.

[Display Processing]

With reference to a flowchart of FIG. 3, display processing executed by the television receiver 1 in FIG. 1 will be described below.

When a predetermined gesture is performed by the user, the controller 13 controls the respective units of the television receiver 1 to thereby make the display unit 15 display content corresponding to a broadcast signal received by the antenna 11 (step S11).

In a step S12, the controller 13 determines whether or not operation by a gesture is carried out by the user based on an evaluation result supplied from the action/posture evaluator 23. As described above, the television receiver 1 executes a predetermined function in response to a predetermined gesture by the user. Therefore, for example operation of the channel is carried out by motion of a hand or arm of the user.

If it is determined in the step S12 that operation by a gesture is not carried out, the processing returns to the step S11, so that the above-described steps S11 and S12 are repeated. That is, in this case, the content corresponding to the received broadcast signal is displayed on the display unit 15.

If it is determined that operation by a gesture is carried out ("Yes" of the step S12), the processing is forwarded to a step S13.

In the step S13, the controller 13 and the action/posture evaluation assistance unit 16 execute action/posture assistance processing. In this action/posture assistance processing, processing of assisting the user so that the user can perform a correct gesture is executed. The details thereof will be described later with reference to a flowchart of FIG. 4.

If a gesture with correct action and posture is performed by the user, the controller 13 controls the respective units of the television receiver 1 to thereby execute the function corresponding to this gesture, such as change of the channel (step S14).

In a step S15, the controller 13 determines whether or not operation by a gesture is carried out and the end of the content displaying is ordered. If it is determined in the step S15 that the end of the content displaying is not ordered, the processing returns to the step S11 and the processing of the above-described steps S11 to S15 is repeated until the end of the content displaying is ordered.

Figure 3:
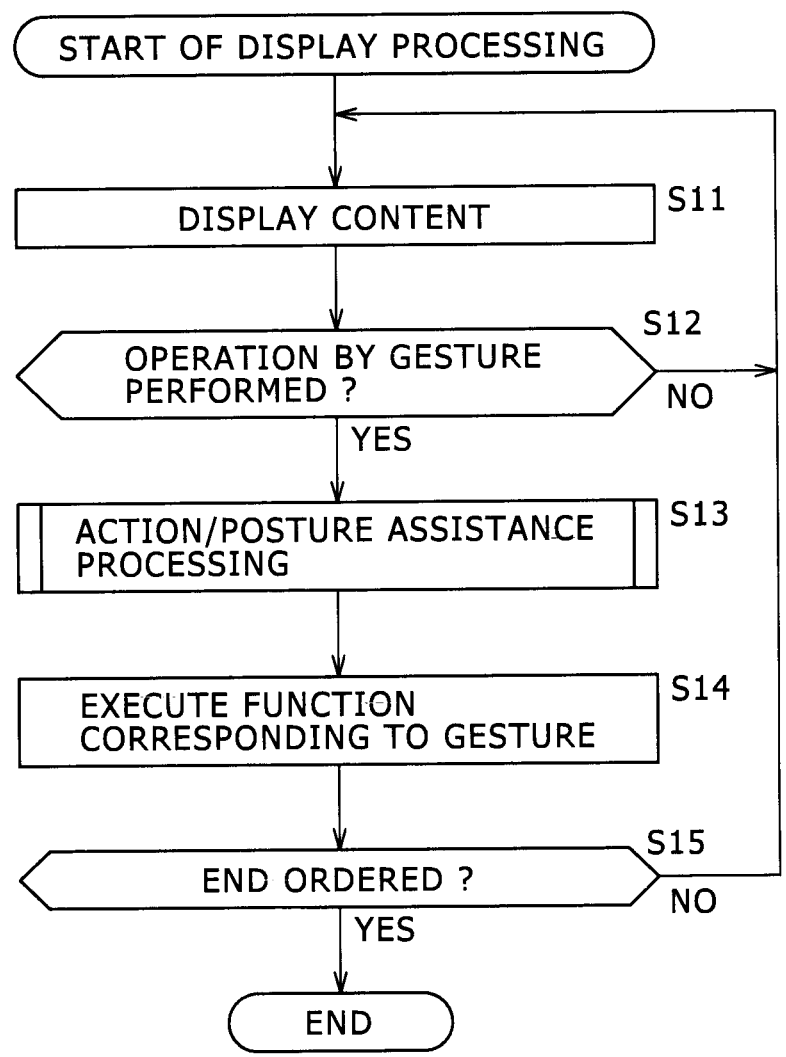
FIG. 3 is a flowchart for explaining display processing.

If it is determined that the end of the content displaying is ordered ("Yes" of the step S15), the display processing of FIG. 3 is ended.

In the above-described manner, in the television receiver 1, the action/posture assistance processing is executed if operation by a gesture is carried out, arid assistance is given so that the user may perform the correct gesture (action and posture).

[Action/Posture Assistance Processing]

With reference to the flowchart of FIG. 4, the details of the action/posture assistance processing of the step S13 in FIG. 3 will be described below.

In a step S31, the image acquirer 21 acquires image data obtained by photographing by the camera 2 and supplies it to the action/posture recognizer 22.

In a step S32, the action/posture recognizer 22 executes the action/posture recognition processing based on the image data supplied from the image acquirer 21.

With reference to a flowchart of FIG. 5, the action/posture recognition processing of the step S32 in FIG. 4 will be described below.

In a step S51, the action/posture recognizer 22 detects a human region in which a person is included from the image data sequentially input from the image acquirer 21. Subsequently, the action/posture recognizer 22 estimates the orientation toward which the person faces from the detected human region (step S52), and detects predetermined parts of the human body, such as limbs and neck (step S53).

In a step S54, based on the estimated orientation of the person and the respective detected parts, the action/posture recognizer 22 estimates three-dimensional joint angles from prior information of motion by use of e.g. the Gaussian process latent variable model (GPLVM).

The method for detecting such a human region and estimating the posture at the joint level is disclosed also in e.g. Monocular 3D pose estimation and tracking by detection Mykhaylo Andriluka, Stefan Roth and Bernt Schiele International Conference on Computer Vision and Pattern Recognition (CVPR2010).

Furthermore, the method for detecting a human region and the method for estimating the posture are disclosed also in e.g. Histograms of Oriented Gradients for Human Detection Navneet Dalal and Bill Triggs CVPR2005, and Learning to parse images of articulated bodies Deva Ramanan NIPS2006.

Figure 4:
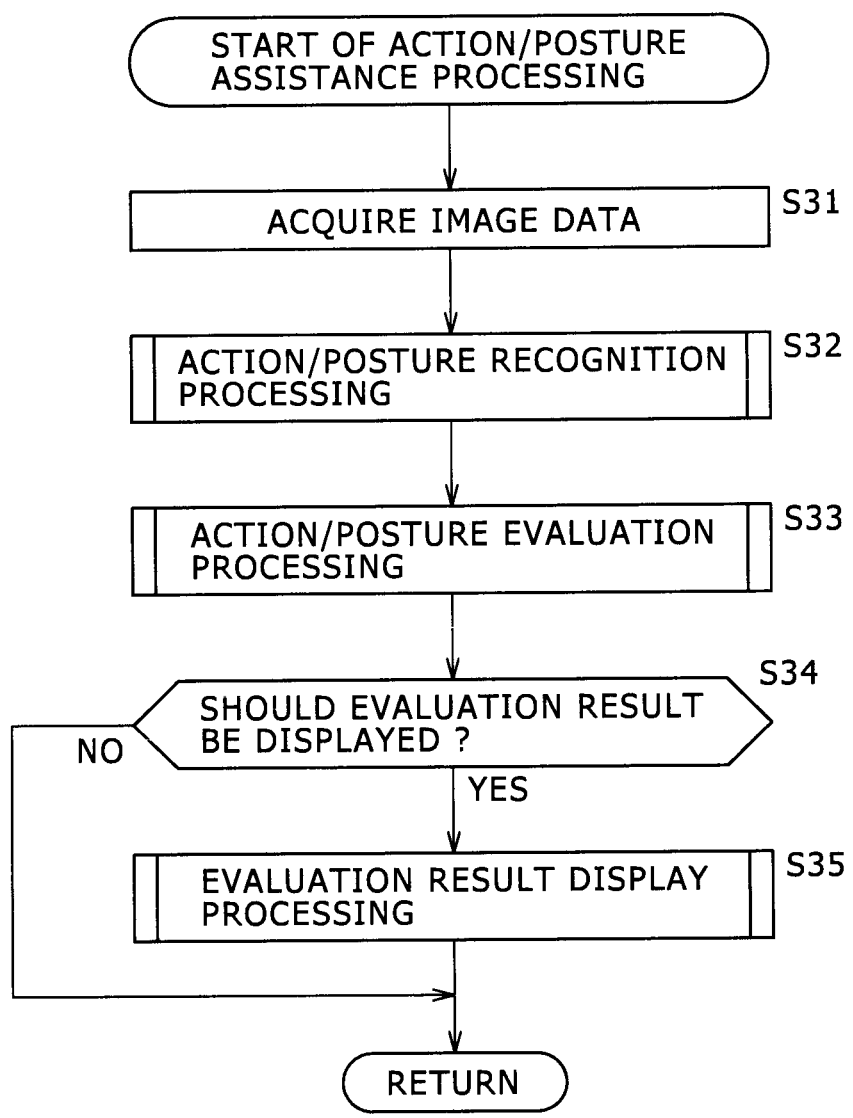
FIG. 4 is a flowchart for explaining details of action/posture assistance processing.
Figure 5:
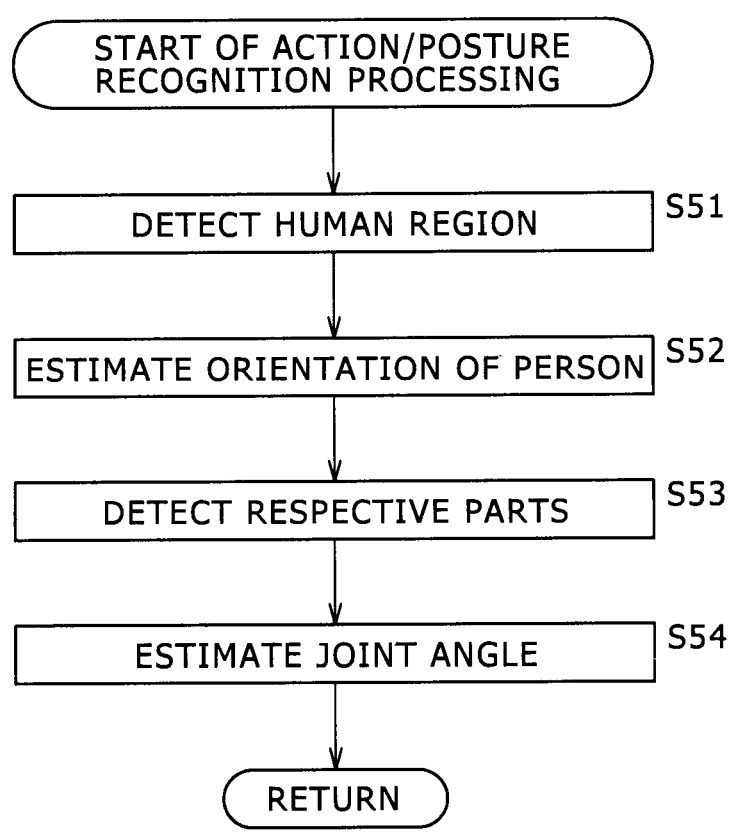
FIG. 5 is a flowchart for explaining details of action/posture recognition processing.

When the action/posture recognition processing is executed and the joint angle of each part is obtained in a time-series manner from the image data sequentially input from the image acquirer 21 in the above-described manner, the processing returns to the flowchart of FIG. 4 and the processing of the step S33 and the subsequent steps is executed.

In the step S33, the action/posture evaluator 23 executes the action/posture evaluation processing by comparing the joint angle of each part supplied from the action/posture recognizer 22 (input-action joint angle) with the joint angle of each part read out from the reference action/posture database 24 (reference-action joint angle).

With reference to a flowchart of FIG. 6, the details of the-action/posture evaluation processing of the step S33 in FIG. 4 will be described below.

In a step S71, the action/posture evaluator 23 specifies the reference action as the subject by seeking a reference action that is identical or similar to the input action estimated from the joint angle of each part recognized by the action/posture recognizer 22 among the reference actions stored in the reference action/posture database 24.

The method for specifying this reference action is as follows for example. Specifically, a reference-action joint angle showing change that is identical or similar to the temporal change in the input-action joint angle is sought from the joint angles of reference actions 1 to n stored in the reference action/posture database 24 of FIG. 2, and the reference action having this reference-action joint angle is specified as the subject reference action. If plural reference actions exist as the reference action having the similar reference-action joint angle, the reference action having the most similar reference-action joint angle may be specified as the subject reference action.

In a step S72, the action/posture evaluator 23 reads out the joint angles corresponding to the reference action specified by the processing of the step S71.

In a step S73, the action/posture evaluator 23 matches the temporal change in the input-action joint angle recognized by the action/posture recognizer 22 (hereinafter, referred to as input-action time series) to the temporal change in the reference-action joint angle read out from the reference action/posture database 24 (hereinafter, referred to as reference-action time series).

Specifically, in most cases, the time length from the start to the end of the input action is different from the time length from the start to the end of the reference action stored in the reference action/posture database 24 in advance. Therefore, these time lengths should be matched to each other. So, normalization of the time length is carried out for each reference action in registration of the reference action in the reference action/posture database 24, and the input-action time series is normalized to the time length of the specified reference action. This can match the input-action time series to the reference-action time series.

After the matching of the input-action and reference-action time series, the action/posture evaluator 23 evaluates the difference between the input action and the reference action (step S74). As this evaluation method, for example, the Euclidean distance between the normalized input-action joint angle and the reference-action joint angle is calculated and thereby how far the input action and the reference action are distant from each other can be evaluated.

Figure 7:
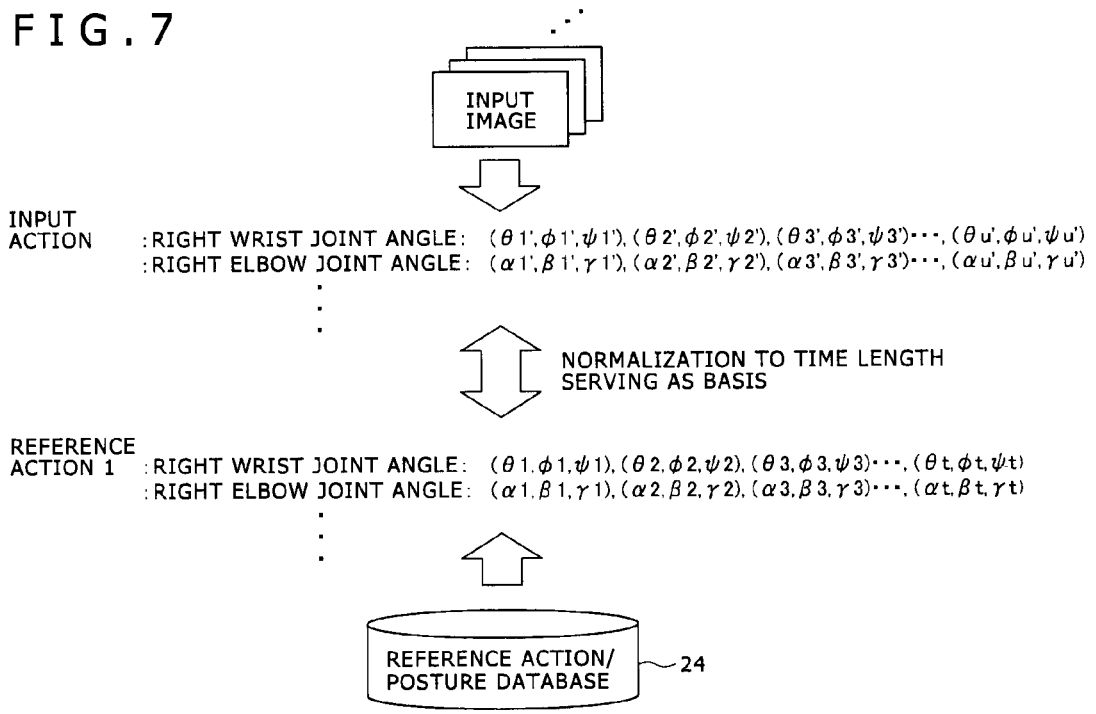
FIG. 7 is a diagram showing an example of calculation of the distance between input action and reference action.

FIG. 7 is a diagram showing an example of the calculation of the distance between the input-action joint angle and the reference-action joint angle.

In the description with FIG. 7, the process from the action/posture recognition processing (FIG. 5) to the action/posture evaluation processing (FIG. 6) is treated as the flow of a series of processing.

As described above, by the action/posture recognizer 22, the joint angle of each part is sequentially recognized from the input image sequentially acquired by the image acquirer 21. For example, the right wrist joint angle ($\theta u'$, $\phi u'$, $\psi u'$), the right elbow joint angle ($\alpha u'$, $\beta u'$, $\gamma u'$), and so forth are recognized in a time-series manner. Due to the achievement of the joint angles such as the right wrist joint angle ($\theta u'$, $\phi u'$, $\psi u'$) in a time-series manner, the reference action corresponding to the input action based on these joint angles is specified.

Furthermore, as described above, for example the right wrist joint angle ($\theta t$, $\phi t$, $\psi 5$), the right elbow joint angle ($\alpha t$, $\beta t$, $\gamma t$), and so forth are registered as the joint angles of reference actions 1 to n in a time-series manner in the reference action/posture database 24.

For example if reference action 1 is specified as the action corresponding to the input action, the time series of the joint angles such as the right wrist joint angle ($\theta u'$, $\phi u'$, $\psi u'$) in the input action is linearly converted to be normalized to the time length of the right wrist joint angle ($\theta t$, $\phi t$, $\psi t$) and so forth in reference action 1. Subsequently, the Euclidean distance between the normalized input-action joint angles (e.g. right wrist joint angle ($\theta t'$, $\phi t'$, $\psi t'$) and so forth) and the reference-action joint angles (e.g. right wrist joint angle ($\theta t$, $\phi t$, $\psi t$) and so forth) is calculated and how far the input action and the reference action are distant from each other is evaluated.

Examples of the method for the distance calculation include a method in which, about the input action and the reference action, the Euclidean distance of the joint angles of all parts is obtained and thereafter the Euclidean distance of the joint angle of each part is obtained. In this method, the distance between the input action and the reference action is obtained based on the distance of all joints and the distance of each joint.

The distance of all joints is calculated by the following equation (1). The distance of each joint is calculated by the following equations (2) and (3).

$$\text{Distance of all joints (whole)} = |\theta 1 - \theta 1'| + |\phi 1 - \phi 1'| + |\psi 1 - \psi 1'| + |\theta 2 - \theta 2'| + |\phi 2 - \phi 2'| + |\psi 2 - \psi 2'| + \ldots + |\theta t - \theta t'| + |\phi t - \phi t'| + |\psi t - \psi t'| + |\alpha 1 - \alpha 1'| + |\beta 1 - \beta 1'| + |\gamma 1 - \gamma 1'| + |\alpha 2 - \alpha 2'| + |\beta 2 - \beta 2'| + |\gamma 2 - \gamma 2'| + \ldots + |\alpha t - \alpha t'| + |\beta t - \beta t'| + |\gamma t - \gamma t'| + \ldots \quad (1)$$

$$\text{Distance of each joint (right wrist joint angle)} = |\theta 1 - \theta 1'| + |\phi 1 - \phi 1'| + |\psi 1 - \psi 1'| + |\theta 2 - \theta 2'| + |\phi 2 - \phi 2'| + |\psi 2 - \psi 2'| + \ldots + |\theta t - \theta t'| + |\phi t - \phi t'| + |\psi t - \psi t'| \ldots \quad (2)$$

$$\text{Distance of each joint (right elbow joint angle)} = |\alpha 1 - \alpha 1'| + |\beta 1 - \beta 1'| + |\gamma 1 - \gamma 1'| + |\alpha 2 - \alpha 2'| + |\beta 2 - \beta 2'| + |\gamma 2 - \gamma 2'| + \ldots + |\alpha t - \alpha t'| + |\beta t - \beta t'| + |\gamma t - \gamma t'| \ldots \quad (3)$$

As examples of the calculation of the distance of each joint, equation (2) for calculating the distance of the right wrist joint angle and equation (3) for calculating the distance of the right elbow joint angle are described. In addition, calculation is similarly performed also about the joint angles of other joints, such as the left wrist joint angle, the left elbow joint angle, and the joint angles of left and right fingers.

In the above-described manner, the difference between the input action and the reference action is evaluated by the action/posture evaluation processing and the evaluation result is supplied to the controller 13 and the assistance screen generator 25.

As this evaluation result, besides the evaluation result by the above-described distance calculation, e.g. the difference between the time length of input action and the time length of reference action (hereinafter, referred to as action time difference) may be included. In this case, the action time difference as the evaluation result is supplied to the assistance screen generator 25.

Figure 6:
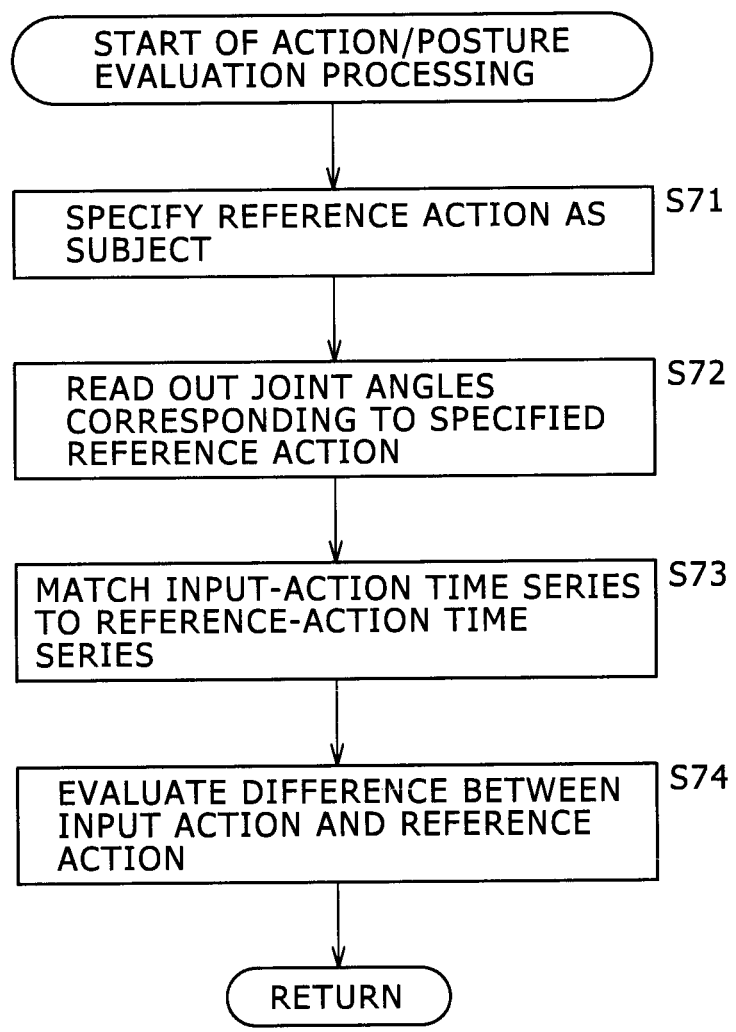
FIG. 6 is a flowchart for explaining details of action/posture evaluation processing.

Referring back to the flowchart of FIG. 6, upon the end of the evaluation of the difference between the input action and the reference action in the step S74, the processing returns to the flowchart of FIG. 4 and the processing of the step S34 and the subsequent steps is executed.

In the step S34, the controller 13 determines whether or not the evaluation result should be displayed based on the evaluation result from the action/posture evaluator 23.

For example, in this determination processing, the distance value that is calculated as the evaluation result and obtained from the distance of all joints and the distance of each joint is compared with a predetermined threshold value set in advance for example. If the distance value surpasses the predetermined threshold value, it is determined that the evaluation result should be displayed.

For example, if the distance between the input action and the reference action is long, it is determined that the evaluation result should be displayed ("Yes" of the step S34) because these actions greatly deviate from each other. If no distance exists between the input action and the reference action or the distance between these actions is not so long, it is determined that the evaluation result does not have to be displayed ("No" of the step S34) because the deviation of these actions falls within the allowable range even when the deviation exists.

That is, basically content is displayed on the display unit 15, and evaluation result display processing is executed only when operation by a predetermined gesture is carried out ("Yes" of the step S12 in FIG. 3) but this operation is not recognized because of failure in this gesture ("Yes" of the step S34 in FIG. 4).

If it is determined in the step S34 that the evaluation result should be displayed, the controller 13 and the assistance screen generator 25 execute the evaluation result display processing in a step S35 eased on the evaluation result from the action/posture evaluator 23.

With reference to a flowchart of FIG. 8, the details of the evaluation result display processing of the step S35 in FIG. 4 will be described below.

The assistance screen generator 25 acquires the evaluation result of each joint from the action/posture evaluator 23 (step S91) and determines whether or not the distance of each joint is equal to or longer than a predetermined threshold value (step S92). The evaluation result of each joint is equivalent to the distance of each of joints such as the right wrist joint and the right elbow joint, obtained by e.g. equations (2) and (3), as described above.

If it is determined in the step S92 that the distance of the joint is equal to or longer than the predetermined threshold value, the assistance screen generator 25 generates an assistance message depending on the distance of the joint in a step S93. If it is determined in the step S92 that the distance of the joint is shorter than the threshold value, the step S93 is skipped and the processing is forwarded to a step SS4.

In the step S94, the assistance screen generator 25 determines whether or not the threshold determination of the distance of the joint has been ended about all joints.

If it is determined in the step S94 that the comparison of the joint angle about all joints has not been ended, the processing returns to the step S91 and the above-described steps S91 to S94 are repeated.

For example if it is determined that the distance of the right wrist joint is equal to or longer than the threshold value and this distance is long due to the repetition of the steps S91 to S94, an assistance message relating to the difference of the joint angle of the right wrist joint of the input action from the joint angle of the right wrist joint of the reference action is generated. At this time, about the joint whose distance is determined to be shorter than the threshold value, a message indicating that correct action is performed regarding this joint may be generated.

Due to this step, the message depending on the difference of the joint angle of the input action from the reference action, evaluated by the action/posture evaluator 23, is generated.

If it is determined in the step S94 that the threshold determination of the distance of the joint about all joints has been ended, the processing is forwarded to a step S95.

Subsequently, the assistance screen generator 25 acquires the evaluation result of the action time difference (difference between the time length of the input action and the time length of the reference action) from the action/posture evaluator 23 (step S95) and determines whether or not this action time difference is within a predetermined range (step S96).

If it is determined in the step S96 that the action time difference is out of the predetermined range, the assistance screen generator 25 generates an assistance message depending on the action time difference in a step S97.

For example, in the above-described normalization of the time series of the input action, if the time length of the input action is shorter than that of the reference action and the difference between these time lengths is out of the predetermined range, the input action is too fast and therefore an assistance message indicating that is generated. For example if the time length of the input action is longer than that of the reference action and the difference between these time lengths is out of the predetermined range, the action is too slow and therefore an assistance message indicating that is generated.

Due to this step, the message depending on the difference of the speed and acceleration of the input action from the reference action, evaluated by the action/posture evaluator 23, is generated.

If it is determined in the step S96 that the action time difference is within the predetermined range, the step S97 is skipped and the processing is forwarded to a step S98.

In the step S98, the assistance screen generator 25 generates an assistance image depending on the evaluation result from the action/posture evaluator 23.

This assistance image is an image superimposed on the input image and is an image for notifying the difference of the input action from the reference action and causing the user to correct the user's action and posture. As the assistance image, e.g. an image depending on the difference of the joint angle of the input action from the reference action, the action time difference, and so forth is generated.

In a step S99, the assistance screen generator 25 generates an action/posture assistance screen by superimposing the assistance image generated by the processing of the step S98 and the assistance messages generated by the processing of the steps S93 and S97 on the input image. Subsequently, the controller 13 makes the display unit 15 display the action/posture assistance screen generated by the assistance screen generator 25 (step S100).

In a step S101, the assistance screen generator 25 determines whether or not the series of input action recognized by the predetermined gesture has been ended.

If it is determined in the step S101 that the series of input action has not been ended, the processing returns to the step S98 and the above-described steps S98 to S101 are repeated. Thereby, an assistance image for the input image as the next frame is generated to be superimposed on the input image together with assistance messages, so that an action/posture assistance screen is generated.

As described above, in order to evaluate the difference between the input action and the reference action, matching of the time series of these actions is carried out. However, if an assistance image is superimposed on the input image, matching is not ensured because the time series normalized to the time length of the reference action does not correspond with the time series of the input image. So, the assistance screen generator 25 returns the time series of the assistance image sequentially superimposed on the input image to the time length of the input action and thereafter superimposes the assistance image on the input image.

Figure 9:
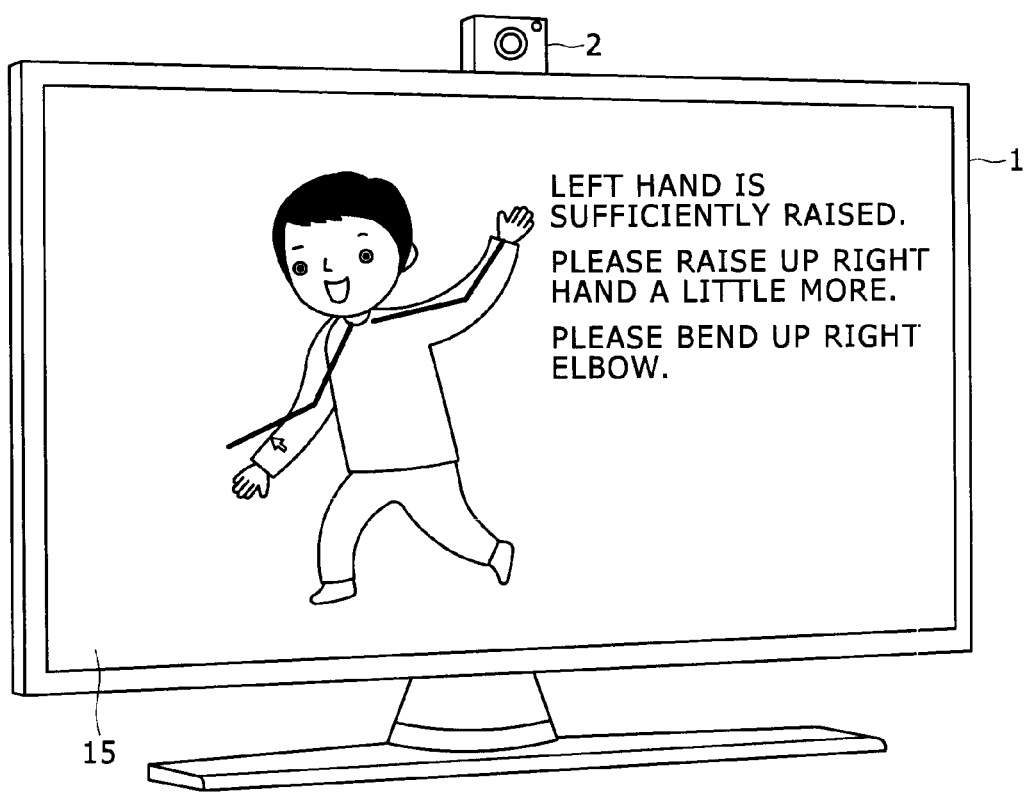
FIG. 9 is a diagram showing a displaying example of an action/posture assistance screen.
Figure 10:
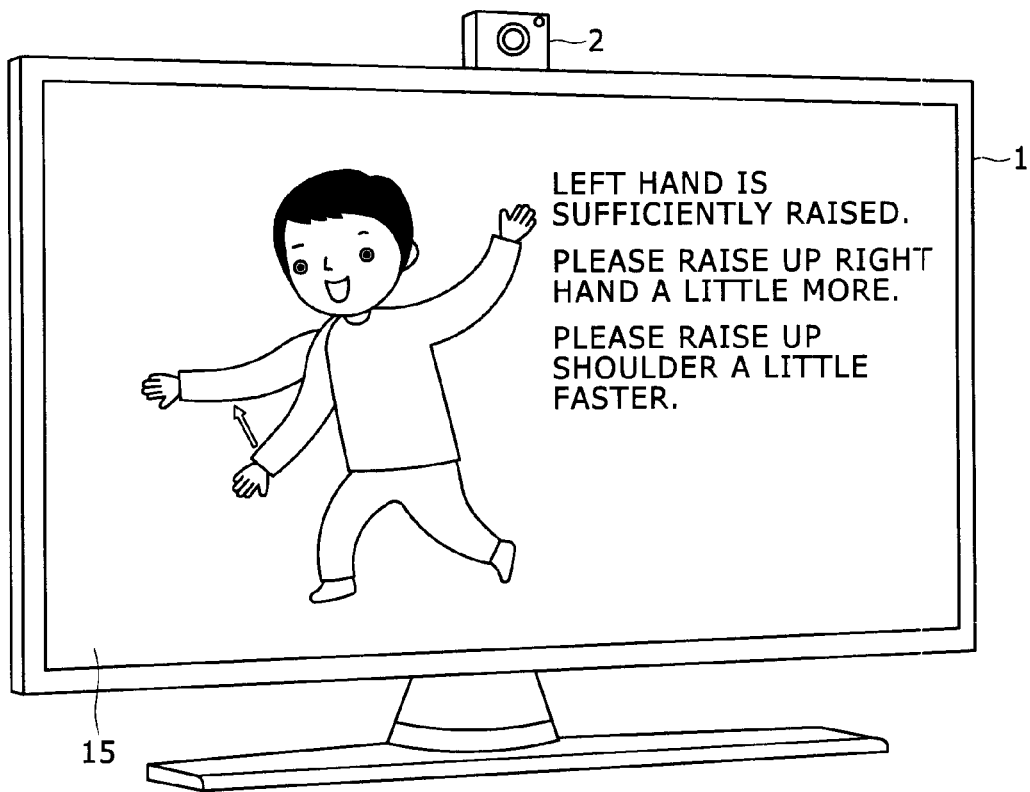
FIG. 10 is a diagram showing a displaying example of the action/posture assistance screen.

That is, if the steps S98 to S101 are repeated until the series of input action recognized based on a certain gesture is ended, e.g. the action/posture assistance screen of FIG. 9 or FIG. 10 is displayed on the display unit 15.

As shown in FIG. 9, in the action/posture assistance screen displayed on the display unit 15, an image of the user that has performed a gesture in front of the camera 2 set at the upper part of the television receiver 1, obtained by photographing by the camera 2, is displayed. In the example of FIG. 9, the user operates the television receiver 1 by the gesture but this input action is estimated as action deviating from the reference action ("Yes" of the step S34 in FIG. 4). Thus, the action/posture assistance screen in association with the evaluation result is displayed on the display unit 15.

In the action/posture assistance screen of FIG. 9, a guide line joining joint group of the respective parts of reference action 1 is superimposed as an assistance image on the input image. In the example of FIG. 9, a guide line for assisting the action of the user's hands is represented as an object indicating correct action by straight lines joining joints from the bottom of the neck to the wrists. This makes it possible to cause the user performing the gesture to intuitively recognize the difference between the recognized input action and the reference action serving as the basis.

As described above, by evaluating the distance between the input action and the reference action, how far these actions are distant from each other is obtained. In the example of FIG. 9, regarding the user's left hand (e.g. left wrist joint and left elbow joint), these actions are scarcely distant from each other and therefore an assistance message, "left hand is sufficiently raised," is displayed on the screen. As for the user's right hand (right wrist joint), the distance between the input action and the reference action is long and therefore assistance messages, "please raise up right hand a little more" and "please bend up right elbow," are displayed on the screen.

If it is difficult to recognize the positional relationship of the respective parts between the input action and the reference action by only the above-described three-dimensional joint angles, these three-dimensional angels may be transformed to three-dimensional coordinates so that the positional relationship of these parts can be recognized.

As described above, on the display unit 15, the action/posture assistance screen obtained by superimposing a guide line as an assistance image and "please bend up right elbow" and so forth as assistance messages on the input image is displayed. In the action/posture assistance screen, the assistance image is dynamically displayed in such a manner as to follow the human motion in the input image (series of input action), and the assistance message is statically displayed at the same position with the same contents.

In the action/posture assistance screen of FIG. 10, as an assistance image, an image of the right arm of the user (part image) is displayed instead of the guide line in FIG. 9. This part image is obtained by executing predetermined image processing for the input image and cutting the area of the right arm included in the input image for example.

As described above, information relating to the difference of the speed of the input action from the reference action is obtained by the action time difference. For example, if the time length of the input action is shorter than that of the reference action, the action is too fast and therefore an assistance message, "please move a little more slowly," is displayed. If the time length of the input action is longer than that of the reference action, the action is too slow and therefore an assistance message, "move a little faster," is displayed.

In the example of FIG. 10, regarding the user's left hand, the distance between the input action and the reference action is almost zero and therefore an assistance message, "left hand is sufficiently raised," is displayed on the screen. As for the user's right hand, the distance between the input action and the reference action is long and therefore an assistance message, "please raise up right hand a little more," is displayed. Furthermore, because the time length of the input action is longer than that of the reference action, an assistance message, "please raise up shoulder a little faster," is displayed.

As described above, on the display unit 15, the action/posture assistance screen obtained by superimposing a part image as a dynamic assistance image and "please raise up shoulder a little faster" and so forth as static assistance messages on the input image is displayed.

Furthermore, because a part image is displayed as an assistance image in the action/posture assistance screen of FIG. 10, the user can correct the user's own action more intuitively while checking both the part of erroneous action and the part of correct action.

Figure 8:
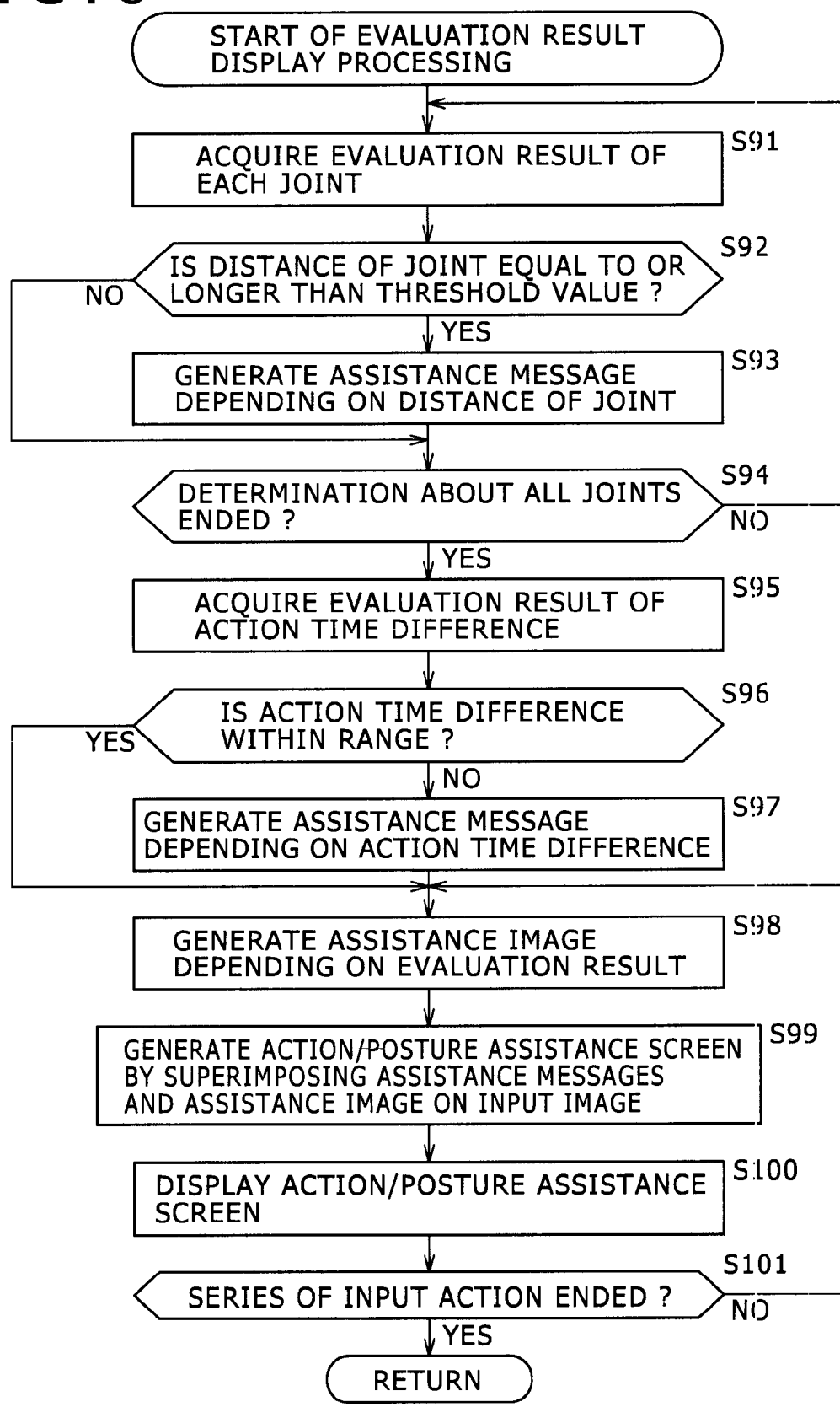
FIG. 8 is a flowchart for explaining details of evaluation result display processing.

Referring back to the flowchart of FIG. 8, when the display processing of FIG. 8 is ended, the processing returns to the step S35 in the flowchart of FIG. 4. If the processing of the step S35 is ended or it is determined in the step S34 that the evaluation result does not have to be displayed, the processing returns to the flowchart of FIG. 3, so that the processing of the step S14 and the subsequent steps is executed.

As described above, in the television receiver 1, the action/posture assistance processing is executed when operation by a gesture is carried out by the user, and e.g. the action/posture assistance screen of FIG. 9 or FIG. 10 is displayed on the display unit 15 if the input action is different from the reference action.

This enables the user to surely perform the correct gesture (action and posture) while checking an assistance image and an assistance message superimposed on the user on the screen. Furthermore, assistance image and assistance message generated on a joint-by-joint basis or on a part-by-part basis are displayed in the action/posture assistance screen, and thus the user can correct the user's own action and posture with high accuracy.

[Configuration of Learning Device]

Figure 11:
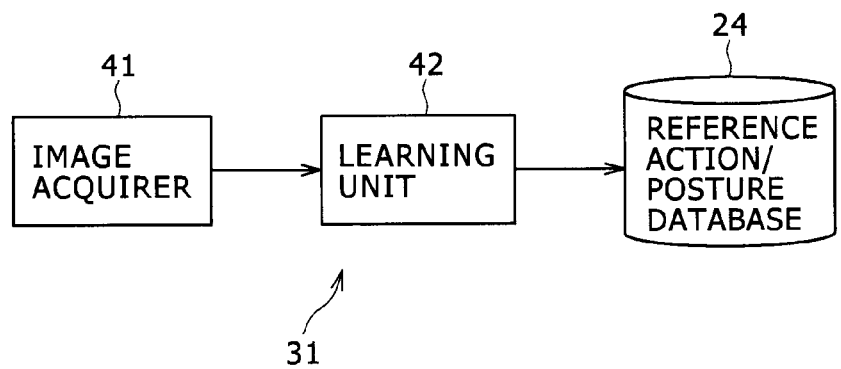
FIG. 11 is a diagram showing a configuration example of a learning device.
Figure 12:
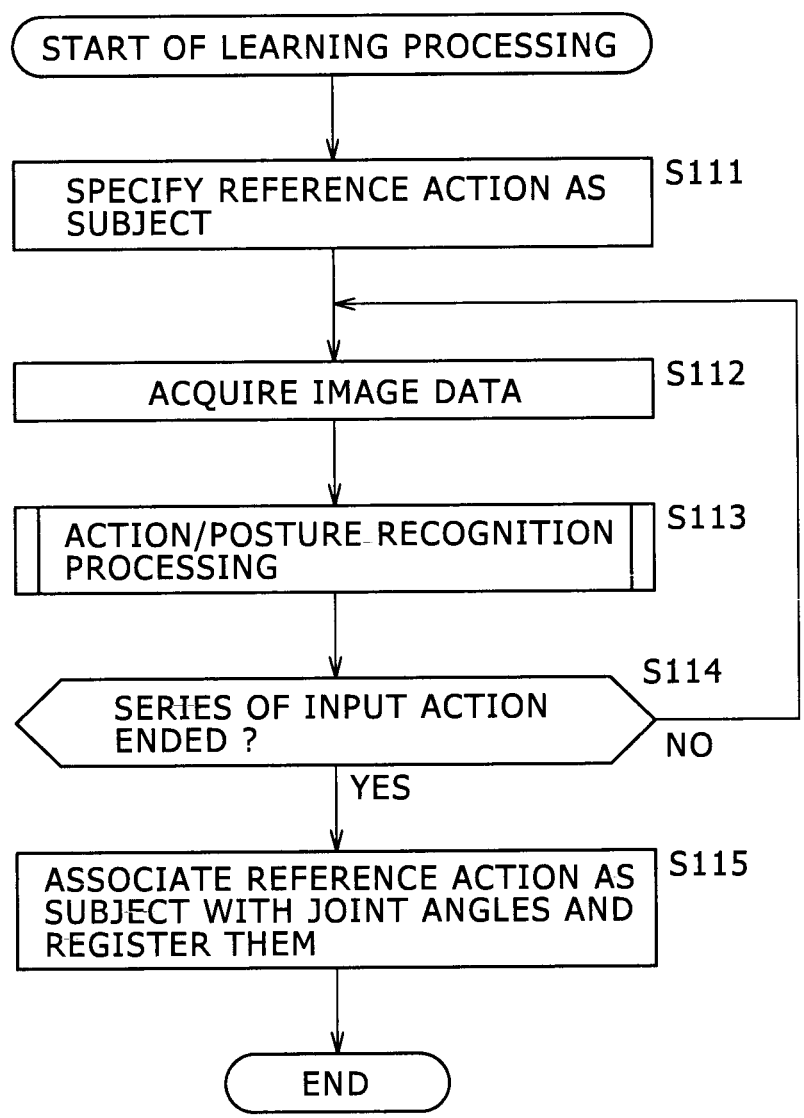
FIG. 12 is a flowchart for explaining learning processing.

With reference to FIG. 11 and FIG. 12, the method for registering reference actions in the reference action/posture database 24 will be described below.

FIG. 11 is a diagram showing a configuration example of a learning device.

As shown in FIG. 11, a learning device 31 includes an image acquirer 41, a learning unit 42, and the reference action/posture database 24. The reference action/posture database 24 is equivalent to the reference action/posture database 24 in FIG. 1.

The image acquirer 41 acquires image data of a sample image including a person performing a predetermined gesture and supplies it to the learning unit 42.

The learning unit 42 executes action/posture recognition processing based on the image data supplied from the image acquirer 41. This action/posture recognition processing is the same as the action/posture recognition processing executed by the above-described action/posture recognizer 22, and the joint angles of predetermined parts of the human body (e.g. user's limbs), obtained from the image data, are recognized on a part-by-part basis.

The learning unit 42 regards the actions corresponding to gestures as reference actions and associates the recognized joint angle of each part with the corresponding reference action for each reference action. Furthermore, the learning unit 42 stores the associated joint angles and reference actions in the reference action/posture database 24.

[Learning Processing]

With reference to a flowchart of FIG. 12, learning processing executed by the learning device 31 will be described below.

In a step S111, the learning unit 42 specifies the reference action as the subject of learning by a sample image. As this reference action, e.g. channel operation is specified based on information input by the user.

To generate the reference action/posture database 24 having high accuracy, the number of registered samples should be increased. Therefore, it is preferable to prepare as many as possible of sample images of the same person or other persons performing a predetermined gesture corresponding to a predetermined function possessed by the television receiver 1.

In a step S112, the image acquirer 41 acquires the image data of sample images.

As this sample image, e.g. an image including a person performing a predetermined gesture corresponding to a predetermined function possessed by the television receiver 1, such as channel operation, is acquired.

In a step S113, the learning unit 42 executes the action/posture recognition processing based on the image data acquired by the image acquirer 41. This action/posture recognition processing is the same as the processing described with reference to the flowchart of FIG. 5 and therefore detailed description thereof is omitted. In this processing, the joint angle of each part of the body of the person performing the gesture is recognized.

After the action/posture recognition processing is executed and the joint angle of each part is obtained from the image data input from the image acquirer 41 in this manner, the learning unit 42 determines whether or not the series of input action recognized based on the predetermined gesture has been ended in a step S114.

If it is determined in the step S114 that the series of input action has not been ended, the processing returns to the step S112 and the above-described steps S112 to S114 are repeated, so that the input image as the next frame is sequentially acquired by the image acquirer 41. Subsequently, the action/posture recognition processing by the learning unit 42 is executed for the input image sequentially acquired, and the joint angle of each part is obtained in a time-series manner from the image data sequentially input from the image acquirer 41.

If it is determined that the series of input action has been ended ("Yes" of the step S114), the processing is forwarded to a step S115.

In the step S115, the learning unit 42 associates the reference action as the registration subject with the joint angle of each part obtained in a time-series manner based on the series of input action, and stores and registers them in the reference action/posture database 24.

For example, plural persons are made to perform the same gesture such as channel operation and this learning processing is executed for the image data of sample images obtained by that. Thereby, the joint angle of each part of the plural persons is obtained in a time-series manner for the reference action as the registration subject. The time lengths of the joint angle obtained in a time-series manner about the respective persons do not correspond with each other in most cases because the respective persons individually perform the gesture. Therefore, these time lengths should be matched to each other. Accordingly, the time lengths of the joint angle obtained about the plural persons are normalized and then the average of the joint angle after the normalization is obtained in a time-series manner. This average joint angle is registered in association with the reference action.

However, without the normalization, the joint angle obtained in a time-series manner about the respective persons may be registered in association with the reference action with their original time lengths. In this case, although plural reference actions exist for the predetermined gesture such as channel operation, the reference action that is the most similar to the input action is specified.

Due to this step, in the reference action/posture database 24, reference actions 1, 2, . . . , n such as channel operation and the joint angles such as the right wrist joint angle and the right elbow joint angle arranged in a time-series manner are stored in association with each other.

In the above-described manner, the learning processing is executed and the reference action is registered in the reference action/posture database 24.

<2. Second Embodiment>
[Action/Posture Assistance System]

Figure 13:
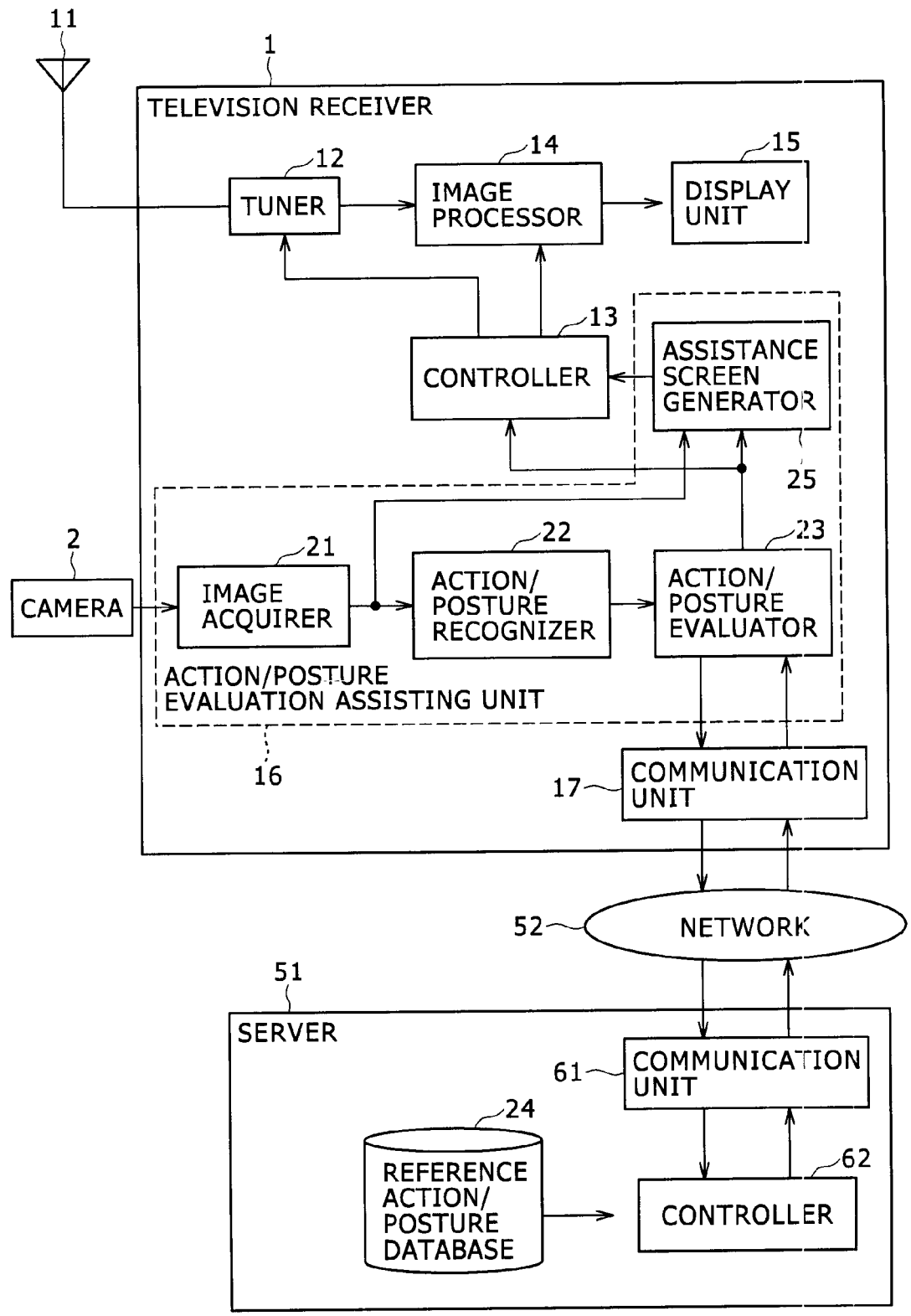
FIG. 13 is a diagram showing a configuration example of an action/posture assistance system.

FIG. 13 is a diagram showing the configuration of an action/posture assistance system composed of the television receiver 1 and a server 51.

In FIG. 13, the same component as that in FIG. 1 is given the same numeral and its description is accordingly omitted. Specifically, in the television receiver 1 in FIG. 13, a communication unit 17 is provided instead of the reference action/posture database 24, as a difference from the television receiver 1 in FIG. 1.

If information relating to the reference action is desired, the action/posture evaluator 23 supplies a request for acquiring the information (hereinafter, referred to as reference action acquisition request) to the communication unit 17. The communication unit 17 transmits the reference action acquisition request supplied from the action/posture evaluator 23 to the server 51 via a network 52.

The server 51 includes a communication unit 61, a controller 62, and the reference action/posture database 24.

The communication unit 61 receives the reference action acquisition request transmitted from the television receiver 1 via the network 52 and supplies it to the controller 62. The controller 62 reads out information relating to the reference action stored in the reference action/posture database 24 and supplies it to the communication unit 61 in accordance with the reference action acquisition request supplied from the communication unit 61. The communication unit 61 transmits the information relating to the reference action, supplied from the controller 62, to the television receiver 1 via the network 52.

The communication unit 17 receives the information relating to the reference action, transmitted from the server 51 via the network 52, and supplies it to the action/posture evaluator 23.

The action/posture evaluator 23 executes action/posture evaluation processing based on the information relating to the reference action, supplied from the communication unit 17, and so forth and supplies the evaluation result to the controller 13 and the assistance screen generator 25.

The processing burden of the television receiver 1 can be reduced by employing the above-described configuration, in which the reference action/posture database 24 is intensively managed by the server 51 and the television receiver 1 is allowed to acquire information relating to the reference action according to need. Furthermore, in addition of the reference action, the reference action can be registered in the reference action/posture database 24 of the server 51 and thus a function can be easily added.

<3. Modification Examples>

In the above-described embodiment, the television receiver 1 operated by a gesture by the user is taken as one example. However, an embodiment of the present disclosure can be applied also to e.g. cellular phone, game machine, personal computer, projector, reproducing device, recording device, and display device. For example, if a display device to which an embodiment of the present disclosure is applied is used for coaching of the golf swing, the difference between an input action obtained from an image arising from photographing of the user performing a swing and a reference action registered in advance is evaluated and the evaluation result is displayed on the display device. This can assist the swing action and enable the user to surely perform a correct swing.

In the example described for the above-described embodiment, the joint angle of each part is obtained in a time-series manner from image data sequentially input. However, in an embodiment of the present disclosure, position information indicating the distance from a predetermined reference point to a predetermined joint (e.g. three-dimensional coordinates) may be used instead of three-dimensional joint angles. The point is to use information that allows action and posture to be uniquely decided. As this information, e.g. angle information (joint angle) or position information (position) is used. If the angle information, which is described for the above-described embodiment, is used, input action and reference action can be evaluated without the influence of the length of limbs and so forth, which differs from person to person.

In the example described for the above-described embodiment, an action/posture assistance screen (FIG. 9, FIG. 10) as an evaluation result is displayed if operation by a predetermined gesture is carried out in displaying of content ("Yes" of the step S12 in FIG. 3) and it is determined that the evaluation result should be displayed ("Yes" of the step S34 in FIG. 4). The timing of displaying of the evaluation result is not limited to the time when operation by the gesture resulted in failure. For example, the evaluation result may be displayed every time operation by a gesture is carried out, and may be displayed at suitable delimitation timing such as the end timing of content. Moreover, a sub-screen may be provided for the main screen displaying content and the evaluation result (action/posture assistance screen) may be displayed in the sub-screen. The sub-screen can be moved to a predetermined position and changed to a predetermined size so that the displayed content may be prevented from being in an invisible state.

In the example described for the above-described embodiment, an action/posture assistance screen (FIG. 9, FIG. 10) is displayed as the method for notifying an evaluation result. For example if evaluation that the user's right hand is not sufficiently raised is obtained, an image representing how to move the right hand from this actual position to the correct position may be displayed as the action/posture assistance screen. Furthermore, in displaying of the subject body part for causing the user to take correct action and posture, this part may be highlighted by blinking, color change, or frame surrounding so that the user can intuitively recognize this part.

In the example described for the above-described embodiment, an action/posture assistance screen is displayed as the method for notifying an evaluation result. However, as long as the evaluation result can be notified to the user, e.g. an audio output unit may be provided as the notifying unit and audio such as "please raise up right hand a little more and move it slowly" may be output. If a projector is used, the evaluation result may be projected onto the user. Moreover, in the example described for the above-described embodiment, a moving image is input as an input image. However, an embodiment of the present disclosure can be similarly employed even when the input image is a still image.

In the example described for the above-described embodiment, in the reference action/posture database 24, reference actions registered in advance and joint angle groups of the reference actions are so stored as to be associated with each other. As these reference actions, reference actions for adults or children and reference actions for men or women may be prepared and be so stored as to be associated with the joint angle groups of these reference actions. This can change the reference action/posture database 24 for use depending on the user and thus can enhance the accuracy of the action/posture evaluation processing. Furthermore, with discrimination of the user individual, the reference action/posture database 24 may be prepared on a user-by-user basis.

Moreover, the reference action may be associated with e.g. an image relating to a predetermined gesture in addition to the joint angle group of this reference action in the reference action/posture database 24, and this image may be displayed depending on the evaluation result.

In the method employed for the above-described embodiment as the method for specifying a reference action (step S71 in FIG. 6), the reference action is specified by seeking a reference-action joint angle showing change that is identical or similar to the temporal change in the input-action joint angle among the reference-action joint angles stored in the reference action/posture database 24. However, the reference action may be specified by another specifying method. An example of such a specifying method is as follows. Specifically, in this method, instead of calculating the distance between the joint angle of the specified reference action and the input-action joint angle after specifying the reference action, the distances between the joint angles of plural reference actions 1 to N and the input-action joint angle are calculated before the reference action is specified. In this specifying method, the distances from N reference actions are obtained for one input action. Therefore, the reference action having the closest distance can be specified among N reference actions.

As another method for specifying the reference action, the reference action as the subject may be specified based on information input by the user.

In the example described for the above-described embodiment, the camera 2 is attached to the upper part of the television receiver 1 and photographs the user existing in front of it. However, the camera 2 may be set at an arbitrary attachment position. For example, plural cameras may be prepared and set at not only a position in front of the user but also such positions as to be capable of photographing the lateral side, the back side, and so forth.

[Explanation of Computer to Which Embodiment of the Present Disclosure Is Applied]

The above-described series of processing can be executed by hardware and can also be executed by software. If the series of processing is executed by software, a program configuring the software is installed from a program recording medium into a computer incorporated in dedicated hardware or e.g. a general-purpose personal computer that can execute various kinds of functions through installation of various kinds of programs.

Figure 14:
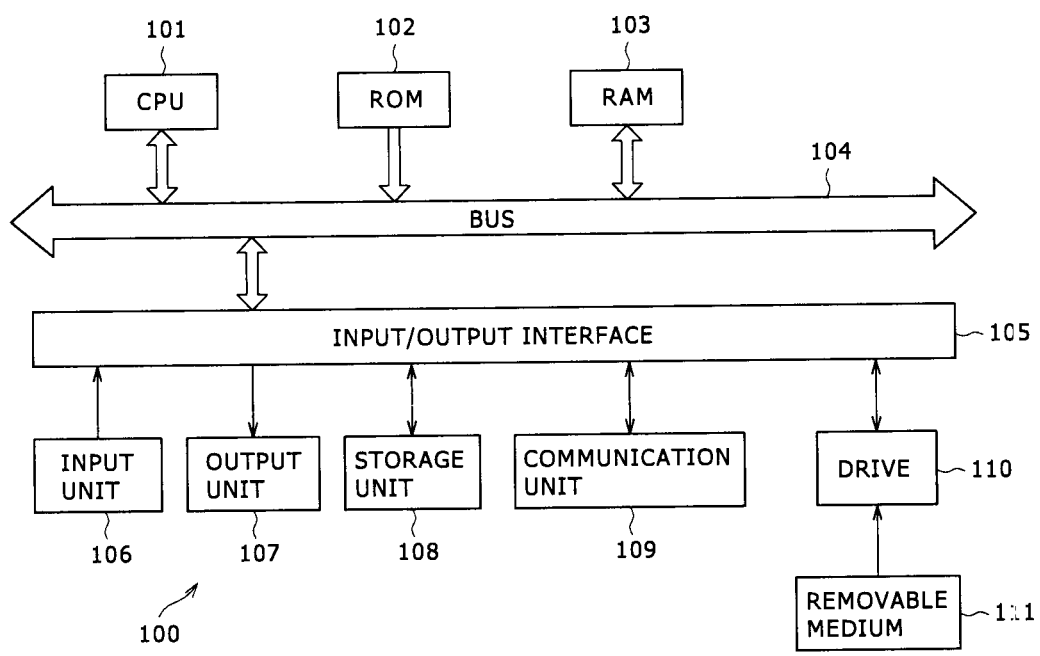
FIG. 14 is a diagram showing a configuration example of a computer.

FIG. 14 is a diagram showing a configuration example of a computer that executes the above-described series of processing by a program.

In this computer 100, a central processing unit (CPU) 101, a read only memory (ROM) 102, and a random access memory (RAM) 103 are connected to each other by a bus 104.

To the bus 104, an input/output interface 105 is further connected. To the input/output interface 105, the following units are connected: an input unit 106 formed of keyboard, mouse, microphone, etc; an output unit 107 formed of display, speaker, etc; a storage unit 108 formed of hard disc, non-volatile memory, etc; a communication unit 109 formed of network interface, etc; and a drive 110 that drives a removable medium 111 such as magnetic disc, optical disc, magnetooptical disc, or semiconductor memory.

In the computer 100 having the above-described configuration, for example the CPU 101 loads a program stored in the storage unit 108 into the RAM 103 via the input/output interface 105 and the bus 104 and runs the program. Thereby, the above-described series of processing is executed.

The program run by the computer may be a program processed in a time-series manner along the order described in the present specification or may be a program processed in parallel or at necessary timing such as when a call is performed.

The system refers to the whole of a device configured with plural devices.

Embodiments of the present disclosure are not limited to above-described embodiments and various changes can be made without departing from the gist of the present disclosure.

The present disclosure contains subject matter related to that disclosed in Japanese Priority Patent Application JP 2010-215680 filed in the Japan Patent. Office on Sep. 27, 2010, the entire content of which is hereby incorporated by reference.

What is claimed is:

1. An information processing device comprising:
   circuitry configured to
   recognize a predetermined part of a body of a person from an input image including the person;
   evaluate a difference between a recognized input part and a reference part serving as a basis; and
   notify information relating to the difference of the input part from the reference part based on an evaluation result by superimposing an image of the input part and one of a guide line indicating movement of the input part toward the reference part and an image of the reference part, and displaying a resulting image, wherein the input image is a moving image, the circuitry compares time length of an input action specified by one of an angle and a position of a joint in the input part, obtained in a time-series manner, with time length of a reference action specified by one of an angle and a position of the joint in the reference part, and evaluates a difference of speed of the input action from the reference action, and the circuitry displays information relating to the evaluated difference of the speed.

2. The information processing device according to claim 1, wherein the input part and the reference part are specified based on one of the angle and the position of the joint in the input part and the reference part, and the circuitry evaluates a difference of one of an angle and a position of the same joint in the input part and the reference part.

3. The information processing device according to claim 2, wherein the circuitry evaluates the difference between the input part and the reference part by performing predetermined distance calculation for one of the angle and the position of the joint in the input part and one of the angle and the position of the joint in the reference part.

4. The information processing device according to claim 3, wherein the circuitry displays information relating to the difference of one of the angle and the position of the joint of the input part from the reference part based on the evaluated difference of one of the angle and the position of the joint.

5. The information processing device according to claim 4, wherein the circuitry displays a message depending on the evaluated difference of one of the angle and the position of the joint.

6. An information processing method comprising:

recognizing a predetermined part of a body of a person from an input image including the person by an information processing device;

evaluating a difference between a recognized input part and a reference part serving as a basis by the information processing device; and notifying information relating to the difference of the input part from the reference part based on an evaluation result by the information processing device by superimposing an image of the input part and one of a guide line indicating movement of the input part toward the reference part and an image of the reference part, and displaying a resulting image reference part and an image of the reference part, and displaying a resulting image, wherein the input image is a moving image, the evaluating includes comparing time length of an input action specified by one of an angle and a position of a joint in the input part, obtained in a time-series manner, with time length of a reference action specified by one of an angle and a position of the joint in the reference part, and evaluating a difference of speed of the input action from the reference action, and the notifying includes displaying information relating to the evaluated difference of the speed.

7. A non-transitory computer-readable storage medium storing computer-readable instructions thereon, which, when executed by a computer, cause the computer to perform a method comprising:

recognizing a predetermined part of a body of a person from an input image including the person;

evaluating a difference between a recognized input part and a reference part serving as a basis; and notifying information relating to the difference of the input part from the reference part based on an evaluation result by superimposing an image of the input part and one of a guide line indicating movement of the input part toward the reference part and an image of the reference part, and displaying a resulting image, wherein the input image is a moving image, the evaluating includes comparing time length of an input action specified by one of an angle and a position of a joint in the input part, obtained in a time-series manner, with time length of a reference action specified by one of an angle and a position of the joint in the reference part, and evaluating a difference of speed of the input action from the reference action, and the notifying includes displaying information relating to the evaluated difference of the speed.

* * * * *